United States Patent
Van Bruyssel (10) Patent No.: US 7,991,072 B2
(45) Date of Patent: Aug. 2, 2011

(54) MULTI-CARRIER MODEM TRANSMITTER WITH CONTROLLED TRANSMIT SIGNAL QUALITY DEGRADATION FOR IMPROVING STABILITY OF OPERATION

(75) Inventor: Danny Edgard Josephine Van Bruyssel, Temse (BE)

(73) Assignee: Alcatel-Lucent, Paris (FR)

( * ) Notice: Subject to any disclaimer, the term of this patent is extended or adjusted under 35 U.S.C. 154(b) by 836 days.

(21) Appl. No.: 11/227,229

(22) Filed: Sep. 16, 2005

(65) Prior Publication Data

US 2006/0062287 A1  Mar. 23, 2006

(30) Foreign Application Priority Data

Sep. 23, 2004 (EP) .................................. 04292292

(51) Int. Cl.
*H04K 1/02* (2006.01)
*H04L 25/03* (2006.01)
*H04L 25/49* (2006.01)

(52) U.S. Cl. ................... 375/296; 375/222; 375/297

(58) Field of Classification Search .................. 375/222, 375/260, 296–297; 370/465
See application file for complete search history.

(56) References Cited

U.S. PATENT DOCUMENTS

| | | | |
|---|---|---|---|
| 5,479,447 A | 12/1995 | Chow et al. | |
| 6,310,909 B1 | 10/2001 | Jones | |
| 6,563,864 B1 | 5/2003 | Ibrahim et al. | |
| 6,850,539 B1 * | 2/2005 | Cassiers et al. | 370/465 |
| 2002/0009155 A1 | 1/2002 | Tzannes | |
| 2003/0123560 A1 * | 7/2003 | Jacobsen et al. | 375/260 |
| 2004/0032902 A1 * | 2/2004 | Koifman et al. | 375/222 |
| 2005/0123027 A1 | 6/2005 | Cioffi | |
| 2005/0123028 A1 | 6/2005 | Cioffi | |
| 2005/0254562 A1 * | 11/2005 | Jani et al. | 375/222 |
| 2005/0259725 A1 | 11/2005 | Cioffi | |

OTHER PUBLICATIONS

T1E1.4/92-203 dated Dec. 1, 1992—ADSL Maintenance with DMT, pp. 1-14.
T1E1.4/2004-471 dated May 24, 2004—Finding MIMO.
U.S. Appl. No. 60/572,051, filed May 18, 2004.
Kerpez, K J. et al: "Advance DSL Management," IEEE Communications Magazine, IEEE Service Center. Piscataway, N.J., US, vol. 41, No. 9, Sep. 2003, pp. 116-123, XP001177649.
"Series G: Transmission Systems and Media, Digital Systems and Networks, Digital transmission systems—Digital sections and digital line system—Access Network, Physical layer management for digital subscriber line (DSL) transceivers." Telecommunication Standardization Sector of ITU (ITU-T) G. 997.1, pp. 1-43 Jun. 1999.

(Continued)

*Primary Examiner* — Curtis B Odom
(74) *Attorney, Agent, or Firm* — Harness, Dickey & Pierce, P.L.C.

(57) ABSTRACT

A telecommunication system with a modem having a controlling module coupled to a data transmission module includes a transmitter configured to transmit channels via a communication line. The channels transport user data by use of signals with modulation having a bitload that is modifiable. The data transmission module includes an artificial noise generator coupled to the transmitter and controlled by the controlling module to inject an artificial noise into the transmitter. The artificial noise is used to influence the signals transmitted by the data transmission module to the communication line and may be added to the data signals either in the transmit time domain processing module or in the transmit frequency domain processing module of the transmitter.

19 Claims, 3 Drawing Sheets

OTHER PUBLICATIONS

Transmission and Multiplexing (TM); Access transmission systems on metallic access cables; Asymmetric Digital Subscriber Line (ADSL)—European specific requirements (ITU-T G.992.1 modified), ETS TS 101 388 v1.3.1, Mar. 2002. European Telecommunications Standards Inst. 2002.

"Series G: Transmission Systems and Media, Digital Systems and Networks, Digital sections and digital line system—Access networks, Handshake procedures for Digital Subscriber Line (DSL) transceivers," Telecommunication Standardization Sector of ITU (ITU-T), G.994.1, pp. 1-157, May 2003.

"Series G: Transmission Systems and Media, Digital Systems and Networks, Digital sections and digital line system—Access networks, Single-pair high-speed digital subscriber line (SHDSL) transceivers," Telecommunication Standardization Sector of ITU (ITU-T), G. 991.2, pp. 1-160, Feb. 2001.

"Very-high bit-rate Digital Subscriber Lines (VDSL) Metallic Interface, Part 3: Technical Specification of a Multi-Carrier Modulation Transceiver", Committee T1-Telecommunications, Working GroupT1E1.4 (DSL Access) Vancouver BC, pp. 1-87, Feb. 2002.

"Draft American National Standard for Telecommunications-Interface Between Networks and Customer Installations—Very-high Speed Digital Subscriber Lines (VDSL), Matallic Interface," Trial Use Standard, Standards Committee T1 Telecommunications, prepared by T1E1.4, Working Group on DSL Access, pp. 1-120, Copyright 2002 by Alliance for Telecommunication Industry Solutions.

"Series G: Transmission Systems and Media, Digital Systems and Networks, Digital sections and digital line system—Access networks," Telecommunication Standardization Sector of ITU (ITU-T), G.992.5, pp. 1-80, May 2003.

Series G: Transmission Systems and Media, Digital Systems and Networks, Digital sections and digital line systems—Access networks, Splitterless asymmetric digital subscriber line transceivers 2 (splitterless ADSL2), Telecommunication Standardization Sector of ITU (ITU-T), G.992.4, pp. 1-16, Jul. 2002.

"Series G: Transmission Systems and Media, Digital Systems and Networks, Digital sections and digital line system—Access networks, Asymmetric digital subscriber line transceivers 2 (ADSL2)," Telecommunication Standardization Sector of ITU (ITU-T), G.992.3 pp. 1-300, Jul. 2002.

Series G: Transmission Systems and Media, Digital Systems and Networks, Digital Transmission systems—Digital sections and digital line systems—Access networks, Splitterless asymmetric digital subscriber line (ADSL) transceivers, Telecommunication Standardization Sector of ITU (ITU-T) G.992.2, pp. 1-148, Jun. 1999.

"Series G: Transmission Systems and Media, Digital Systems and networks, Digital transmission systems—Digital sections and digital line system—Access networks, Asymmetric digital subscriber line (ADSL) transceivers," Telecommunication Standardization Sector of ITU (ITU-T), G.992.1, pp. 1-240, Jun. 1999.

"Data Communication Over the Telephone Network, A Duplex Modem Operation at Data Signalling Rates of up to 14 400 bit/s for Use on the General Switched Telephone Network and on Leaseed Point-To-Point 2-wire Telephone-type Circuits," The International Telegraph and Telphone Consultative Committee (CCITT), V.32 bis, Geneva 1991, pp. 1-22.

VDSL Technical Specification, Part 2: Technical Specification for a Single-Carrier Modulation (SCM) Transceiver., Committee Tl-Telecommunications, Working Group T1E1.4 (DSL Access) Greensboro, NC, Nov. 5-9, 2001, p. 1-76.

* cited by examiner

Fig. 1

MULTI-CARRIER MODEM TRANSMITTER WITH CONTROLLED TRANSMIT SIGNAL QUALITY DEGRADATION FOR IMPROVING STABILITY OF OPERATION

The present invention relates to a telecommunication system with a modem having a controlling module coupled to a data transmission module comprising a transmitter adapted to transmit at least one channel via a communication line, said channel being adapted to transport user data by means of signals with modulation having a bitload that is modifiable.

Such a telecommunication system with a modem capable of operating at different bitloads/datarates is generally known in the art. Therein, the bitload/datarate is based on current channel conditions, generally resulting from measurements.

The "bitload" is defined as following. If the modulation is BaseBand Modulation (BBM) or Single Carrier Modulation (SCM), the bitload corresponds to the number of information bits per modulation symbol, also called modulation or signaling time slot. If the modulation is Multi Carrier Modulation (MCM), the bitload corresponds to the set of numbers describing the number of information bits per modulation symbol for each carrier, e.g. corresponds to the array of bi as defined in ITU-T Recommendations G.992.3 Section 8.5.

BaseBand Modulation (BBM) is a modulation type without first modulating the signal onto a carrier, e.g. Pulse Amplitude Modulation (PAM); Single Carrier Modulation (SCM) is a modulation type in which the signal is modulated onto a single carrier, e.g. Quadrature Amplitude Modulation (QAM), Carrierless AM-PM (CAP); and Multi Carrier Modulation (MCM) is a modulation type in which multiple carriers are used, e.g. Discrete MultiTone modulation (DMT). These modulation types are generally known in the art.

The process of determining a bitload is called "bitloading". This can be a determination of the complete bitload as in initialization, a determination of a part of the bitload as in "Showtime" BitSwapping, e.g. as defined in ITU-T Recommendations G.992.1, or a determination of a part of the bitload or of the complete bitload, as in "Showtime" On Line Reconfiguration (OLR), e.g. as defined in ITU-T Recommendations G.992.3.

"Initialization" (a.k.a. Training) is the state or time period immediately preceding "Showtime", during which signals are exchanged between modems in order to prepare showtime, but in which no user data are being communicated. Showtime (a.k.a. Data Transmission State or Steady State) is the state during which user data are being communicated by the modems.

A channel condition is any characteristics of the channel. The channel being defined as starting at the interface where the to be transmitted user data is given as input to the modem, and ending at the interface where the received user data is given as output by a modem connected to the other end of the communication line. Therefore, the channel includes, on top of the communication line, following modem functional blocks, well known in the art: line interface, analog front end, analog-to-digital convertors, digital-to-analog convertors, transmit and receive filters, gain scalers, modulation/demodulation, constellation encoding/decoding, channel coding/decoding, forward error correcting coding/decoding, scramblers, CRC generation and verification, . . . . As such any parameter which can be measured in any of the functional blocks of the channel constitutes a channel condition. The channel condition measurement predominantly used in the prior art is the Signal-to-Noise Ratio (SNR) measured at the receiver, for MCM typically on each of the carriers.

In known telecommunication systems, a problem occurs in the modem on channels with fast changing noise conditions. If the noise environment changes drastically after startup, i.e. during the showtime, due for instance to crosstalk caused by a neighboring modem starting up, the bitload may need to be modified in order to adapt to the new conditions. In some cases, such processes (like BitSwapping or OLR) that adapt the bitload during showtime are not sufficient and a re-initialization may be needed. This interrupts the service and is disturbing to the customer.

In other words, the "traditional" bitloading cannot take into account sudden changes in noise environment. When changes are too high, on-line reconfiguration cannot cope and the only option is to shut down the connection en do a re-initialization. A re-initialization will always interrupt the service, even if it can be shorter than a full initialization.

To solve this problem, different solutions exist in the art.

It is first to be noted that, in a preferred embodiment of the present invention, the modem is an adaptive xDSL modem and that the following more particularly, but not exclusively applies thereto.

Such a DSL modem is a modem which is part of a Digital Subscriber Line (DSL) capable of operating at different bitloads/datarates. An Asymmetric Digital Subscriber Line (ADSL) modem or a Very high speed Digital Subscriber Line (VDSL) modem for instance belong to the adaptive xDSL modem type.

Most, but not all, of known solutions to the above problem are applicable to an adaptive xDSL modem.

A first known solution to limit the vulnerability of modems to fast increasing noise levels that could be absent at the time of initialization, is the adapt the bit allocation and/or datarates during operation (i.e. in showtime). In current multi-carrier modems the initial datarate and the initial bitload is determined based on the Channel SNR-per-carrier measured during initialization, which is only a snapshot in time corresponding to the current noise conditions. However, over the course of time (during showtime) the noise conditions on the loop can vary, requiring a different shape of bitload for the same datarate (with decreased SNR margin) or could even require a decrease of the datarate. For slow variation in the noise conditions, methods have been defined in ADSL and VDSL standards to adapt the bitload in both ways: bit swap, i.e. change of bitload without change in datarate, as for instance mentioned in ADSL ITU G.992.1, ADSL2 ITU G.992.3 and ANSI T1.424 MCM VDSL, and respectively Seamless Rate Adaptation (SRA), i.e. change of bitload with change in datarate, as for instance mentioned in ADSL2 ITU G.992.3. Both these methods are also called "On Line Reconfiguration" (OLR).

This first solution is good for slowly changing noise conditions.

However, in some crosstalk scenarios, the noise condition varies fast, and the proposed solution is too slow to react in time to avoid bit errors and/or to avoid a re-initialization. The reason therefore is that crosstalk noise from a newly switched-on xDSL modem increases instantaneous.

A second known solution to limit the vulnerability of modems to fast increasing noise levels that could be absent at the time of initialization, is the use of an a-priori determined limitation to a certain maximum datarate. The level of limitation is determined by means outside the modem, but is communicated to the modem via a management interface before bitloading in initialization.

In modems using BaseBand Modulation (BBM) or Single Carrier Modulation (SCM) this second solution gives sufficient control. Indeed, in the case that the modems use a fixed bandwidth and an adaptive constellation size, the limitation to a maximum datarate will result in a limitation to a maximum number of bits per symbol (i.e. the PAM or QAM constellation size). Therefore, to an upper limit on the minimum required SNR (e.g. to sustain a desired Bit Error Rate (BER) of e.g. 1E-7 with a desired SNR margin of e.g. 6 dB). The limitation is chosen such that the minimum required SNR is lower than or equal to the expected "worst case" (i.e. lowest) SNR, occurring during "worst case" noise conditions. Modems implementing the ITU-T V.32-bis voiceband modem standard are examples of this case.

In the case that the modems use a fixed constellation size and an adaptive bandwidth (given a fixed transmit power), the limitation of the datarate will result in a limitation of the bandwidth, and therefore to an increase in transmit PSD level. The limitation is chosen such that the required transmit PSD level minus the fixed required SNR is higher than or equal to the expected "worst case" noise level, occurring during "worst case" noise conditions. Modems implementing the ITU SHDSL G.991.2 Recommendation are examples of this case.

It is further to be noted that modems implementing the ANSI T1.424 SCM VDSL standard are not rate-adaptive and are therefore having the concept of maximum datarate.

Moreover, in modems using Multi-Carrier Modulation (MCM), this second solution does not give sufficient control. Indeed, the a-priori limitation to a maximum datarate will result only in a limitation to a maximum the number of bits per MCM symbol, which is a limitation only on the SUM OF the number $b_i$ of bits per carrier, summed over all carriers used $$\left(\text{i.e. } \sum_i b_i \leq \text{limit}\right).$$

As it does not provide a limitation of the number of bits for each specific carrier ($b_i$), it is possible that during initialization with low noise conditions, the modem determines a bitload which allocates a $b_i$ on some carriers which is too high, needing a required SNR higher than the "worst case" SNR on those carriers during fast increasing noise condition. The more the shape of the noise spectrum during initialization is differing from the shape of the fast increasing noise during operation, the higher the vulnerability, and the higher the likelihood of excessive BER or re-initialization. Modems implementing any of the known (up-to-date) ITU Recommendations ADSL ITU G.992.1, G.992.2, G.992.3, G.992.4, G.992.5 or VDSL ANSI T1.424 MCM standard are examples of this case.

It is to be noted that this second known solutions is available in almost all types of modems: baseband, single carrier, multi-carrier, . . . .

A third known solution to limit the vulnerability of modems to fast increasing noise levels that could be absent at the time of initialization, is the use of an a-priori determined (single number) limitation of the maximum constellation size to a certain maximum number of bits per constellation, i.e. PAM or QAM constellation size. The level of limitation is determined by means outside the modem, but is communicated to the modem via a management interface before bitloading in initialization.

This third solution is identical to the above second solution and gives sufficient control in modems using BaseBand Modulation (BBM) or Single Carrier Modulation (SCM).

However, in modems using Multi-carrier Modulation (MCM) this third solution does not give sufficient control. Indeed, the a-priori limitation to a certain a-priori determined (single number) maximum constellation or maximum number of bits per constellation (i.e. max $b_i \leq$ limit), e.g. the G.992.1 limit that is called BIMAX, does not provide a sufficient limitation of the number of bits for each specific carrier ($b_i$). It only limits the $b_i$ on the carriers with the largest constellations, and these carriers are not necessarily the carriers that are vulnerable to fast changing noise levels. Also carriers with smaller constellations could be affected by fast changing noise levels. In other words, a max $b_i$ acts on carriers with large SNR values during initialization, which do not coincide with carriers with large SNR variation during showtime.

Modems implementing any of the known (up-to-date) ITU Recommendations ADSL ITU G.992.1, G.992.2, G.992.3, G.992.4, G.992.5 and VDSL ANSI T1.424 MCM standard are non-perfect examples of this case. The BIMAX is fixed during the design phase of the modem transmitter, and not controllable over a management interface.

It is to be noted that this third known solutions is available in almost all types of modems: baseband, single carrier, multi-carrier, . . . .

A fourth known solution to limit the vulnerability of modems to fast increasing noise levels that could be absent at the time of initialization, is the use of an a-priori determined (single number) Target SNR margin. In this solution, the noise level assumed during initialization for determining the datarate equals the noise level measured during the current conditions of initialization but increased with a certain factor called "Target SNR margin". The level of the target SNR margin is determined by means outside the modem, but is communicated to the modem via a management interface before bitloading in initialization. Typically the target SNR margin is chosen such that it is higher or equal to "worst case" noise level minus the best-case noise level. By doing so, the assumed noise level is always higher than the "worst case" noise level. Again this solution is available in almost all types of modems: baseband, single carrier, multi-carrier, . . . . Examples of such modems are respectively, modems implementing ITU SHDSL G.991.2 Recommendation, respectively ANSI T1.424 SCM VDSL standard, and respectively ITU Recommendations ADSL G.992.x up-to-date or ANSI T1.424 MCM VDSL standard. This fourth known solution is the most used today for ADSL modems.

It is to be noted that the term "worst case" is used as a short hand. It does not necessary mean to the "worst case" ever, e.g. over infinite time, or over all lines of the complete network. It corresponds to that case of channel conditions having a pre-determined acceptable likelihood of occurrence such that an operator is deeming this acceptable, e.g. acceptable stability of the link over a certain given time period, or for a subset of the network.

This fourth solution is the most used at the present time. However, it is not suited for some situations as mentioned below.

This fourth known solution is not suited for noise types with fast increasing noise levels, which remain stable at a high level afterwards (for a non-negligible time), e.g. crosstalk rising from the switching-on of an xDSL system on another pair in the same cable. For this type of noise, it is clear that the initialization/re-initialization could take place during the "worst case" noise conditions. Taking a high target SNR margin on top of these "worst case" noise levels, is unnecessary and leads to an excessive loss of datarate.

This is for instance the case of a twisted pair cable with ADSL links, but where the ADSL modems are not yet switched-on by their users. Then, the ADSL crosstalk level in the cable is absent. The noise level will be equal to the background noise level. The first ADSL modem that switches-on will see this background noise level during initialization. However, the crosstalk level will increase with each new ADSL modem that is switched on. When during operation of this first link, the number of users increases, e.g. from 1 to 50, the channel crosstalk will increase to its worst case maximum. Table 1 gives approximate numbers for the increase of noise level Δ when the noise evolves from a background noise of −140 dBm/Hz to a level corresponding with a Far-End CrossTalk (FEXT) of 50 ADSL disturbers:

TABLE 1

| Loop length 0.4 mm | Noise level increase Δ [dB] (approx.) | G.992.5 Downstream rate [Mbps] with 6 dB SNR margin in SELF XT (approx.) |
| --- | --- | --- |
| 1000 m | 40 | 17 |
| 2000 m | 30 | 13 |
| 3000 m | 18 | 6 |
| 4000 m | 7 | 3 |

With the target SNR margin solution, the operator will have to assign a large target SNR margin at least equal to this noise level increase, in order for this first user to have a stable operation, and to withstand the noise increases. As can be seen, the SNR margin that has to be taken for stable operation increases for larger offered datarates.

For a user connecting when all other (e.g. 49) users are already on line, the noise is already at its maximum and will not increase any further. Taking a large SNR margin is not necessary in this case. However, as the operator is not aware of the order in which the users are switching-on, he has to assign one target SNR margin for all users. Therefore this large target SNR margin is assigned as well to the last user(s). As a consequence, the last user(s) will experience an excessive datarate loss. As an example, for 3000 m, the SNR margin to be taken is 18 dB. This is 12 dB higher than the usual 6 dB as shown in the Table 1. A loss of 12 dB corresponds to 4 bit per carrier. Over a 1 MHz usable bandwidth, this corresponds to a datarate loss of 4 Mbps, resulting in a reduction of the datarate to 2 Mbps.

It is also not suited for impulsive noise types, i.e. fast increasing and decreasing noise of very short duration. Due to the very short duration, it has negligible influence on the noise measurement result during initialization. The measurement will only indicate the average noise power level over the full measurement period, corresponding with the stationary noise component and not the "worst case" peak power level during the impulse noise. As impulsive noise and stationary noise come from different independent sources, taking a SNR margin with respect to the stationary component is a problematic solution to cope with impulsive noise.

It is also not suited for noise types of short duration, i.e. with a duration that is shorter than the duration of the noise measurement during initialization, e.g. <1 sec. The measurement will only indicate the average noise power level over the full measurement period that somewhat influence the measurement result, and not the "worst case" peak power level during the noise with short duration. This case is a noise type that falls in between the two above noise types and, as a consequence, its disadvantages are a mixture of the disadvantages of the two above cases as well.

On the other hand, this fourth solution is suited for fast small changes in actual noise levels per carrier, in such a way that the loss in datarate is then still acceptable.

It is also suited for slow but somewhat larger changes in actual noise levels per carrier bit with still a small change in average noise level, e.g. due to temperature effects. In this case, the On Line Reconfigurations can adapt the bit loading with bitswap, before the SNR margin per carrier drops below zero. However, the average SNR margin will still decrease slowly. As long as the change in average noise level is small, the target SNR margin can be kept acceptable.

Modems implementing any of the known (up-to-date) ITU Recommendations ADSL ITU G.992.1, G.992.2, G.992.3, G.992.4, G.992.5 and the VDSL ANSI T1.424 MCM standard are examples of this case.

A fifth known solution to limit the vulnerability of modems to fast increasing noise levels that could be absent at the time of initialization, is the use of an a-priori determined model of the "worst case" noise level, occurring during "worst case" noise conditions, which is fixed in a standard or some other design document, and therefore is fixed in the equipment. This solution is known only in the domain of datarate-adaptive ITU SHDSL G.991.2 modems, where the model of the expected "worst case" noise level is fixed in this ITU standard (see for instance G.991.2 Table A-13 & Table B-14). This is possible because of the deployment method of Symmetric DSL or SHDSL, using fully overlapped spectra in downstream and upstream, which makes that the self Near End-CrossTalk (NEXT) from SHDSL systems working at the same rate is the dominant crosstalk, higher than the crosstalk from any other xDSL type with the same power. The "worst case" noise model is not communicated to the modem via a management interface before bitloading in initialization, only the enabling of this solution is controlled over the management interface.

The problems to apply this fifth known solution, of using an a-priori model of the "worst case" noise level fixed in a standard, to multi-carrier modems are the following:

The use of an a-priori model is only defined in ITU SHDSL G.991.2 standard, but not for ADSL modems; and SHDSL describes only the use of an a-priori model that is a standardized, fixed, non-programmable model, and which can only be disabled or enabled.

This fifth solution is thus not suited for ADSL. Indeed, unlike for SHDSL, for which its own self-crosstalk determines the worst noise conditions because of the use of fully overlapped spectra, the FDM architecture of ADSL is such that the ADSL self-crosstalk is often much lower than the crosstalk from other xDSL. Due to this dependence on the other xDSL present in a cable or communication line, and the varying types of xDSL used in particular networks, a single a-priori model is not suited.

An object of the present invention is to provide a telecommunication system with a modem of the above known type but wherein the initial datarate and initial bitload are determined such that an acceptable stability of operation over an extended time is obtained, at datarates which are as high as possible. The vulnerability of modem to fast increasing noise levels that could be absent at the time of initialization should thereby be limited.

According to the invention, this object is achieved due to the fact that said data transmission module further comprises an artificial noise generator coupled to said transmitter and adapted, under control of the controlling module, to inject an artificial noise into the transmitter to influence the signals transmitted by said data transmission module to the communication line.

In this way, a controlled transmit signal quality degradation is obtained by injecting the artificial noise into the transmit signal. This degradation will add to the signal degradation caused by the channel, e.g. the transmit noise will add to the channel noise. A receiving modem will only see the combined effect, and determine its bitloading based on the combined signal quality, e.g. determine its bitloading based on the combined noise level. With this technique the bitloading in the remote modem receiver is prevented to assign constellation sizes which are too high, e.g. when initialization occurs in non-busy hours with low crosstalk levels, to guarantee stability of operation in fast changing noise conditions.

The known fifth solution mentioned above seems to be the closest prior art, but is not used in current ADSL and VDSL. The present invention uses a model that is programmable and not fixed in the standard, and therefore becomes suited for FDM xDSL modems, e.g. ADSL and/or VDSL.

As already mentioned, the known fourth solution mentioned above is the most used in current ADSL and VDSL. Although prior art is trying to solve the same problem, it can not be considered as close prior art, as the algorithmic method is completely different.

In a first embodiment, the present invention is characterized in that said transmitter includes a transmitter front end comprising the cascade connection of a transmit frequency domain processing module, an Inverse Fast Fourier Transformer and a transmit time domain processing module, and in that said artificial noise generator is coupled to an input of said transmit time domain processing module.

Preferably, transmit time domain processing module is adapted to add signals provided by said artificial noise generator to the user data transmitted to the communication line.

In a second embodiment, the present invention is characterized in that said artificial noise generator is coupled to an input of said transmit frequency domain processing module.

In this second embodiment, said transmit frequency domain processing module is adapted to preferably add signals provided by said artificial noise generator to the user data transmitted to the communication line.

In more detail, the signals provided by said artificial noise generator are a plurality of independent noise signals, and said transmit frequency domain processing module further comprises means adapted to multiply each of said independent noise signals by a predetermined gain scaling and to add each of the results to a specific DMT subcarrier signal.

Another characterizing embodiment of the present invention is that the controlling module of said modem is coupled to a management device adapted to store parameters of a "worst case" channel condition and to control therewith said controlling module to control the generation of said artificial noise by said artificial noise generator.

In this way, the level of degradation is programmable via a local or remote management interface.

Also another characterizing embodiment of the present invention is that said telecommunication system further comprises a plurality of communication lines, each operating similarly to the first mentioned communication line and arranged in a cable, and that said artificial noise generator is adapted to provide signals based on a model of the signal-to-noise ratio on said channel of said first communication line.

The modem is thus less likely to re-initialize when a dominant noise appears on the communication line because this noise has generally been identified at least once during a previous measurement. A previous measurement can be a measurement prior to the bitloading in a previous initialization or can be a measurement prior to the previous (partial or complete) bitloading in showtime, or can be a measurement prior to the current measurements (i.e. which are immediately prior to the current bitloading). Furthermore, when performing bitloading, taking into account a previous history of channel conditions or measurements, in one form or another, does not necessarily require a full history of all previous channel conditions or measurements.

In a different embodiment, said artificial noise generator is adapted to provide signals based on a model of the noise level on said channel of said first communication line.

In other words, the artificial noise could be based on an a-priori model of the "worst case" channel conditions: noise level, SNR, . . . .

The present invention further relates to a method to improve the bitload of a channel transmitted via a communication line, said channel being adapted to transport user data by means of signals with modulation having a bitload that is modifiable.

Beside the above mentioned prior art of devices and methods to improve the bitload of a channel transmitted via a communication line, exists another method disclosed in the European Patent Application 04290523.2, filed on Feb. 26, 2004, and entitled "Digital Subscriber Line Modem with Bitloading using Channel Condition Model". This document disclosed a MCM modem bitloading method for improving stability of operation using a 'Worst Case' channel model". However, this method requires modification of the installed base remote modems.

The further object of the present invention is to provide a method to determine an initial datarate and initial bitload such that an acceptable stability of operation over an extended time is obtained, at datarates which are as high as possible.

According to the invention, this method comprises the step of injecting an artificial noise to modify the signals prior to transmit said user data onto the communication line, and further comprises the step of programming the noise margin at 3 dB in the bitloading algorithm in the corresponding receiver.

In this way, the present method can guarantee absolute stability of the link, e.g. no RE-INITIALIZATION and no excessive BER, without an excessive loss of datarate working without modification of installed base remote modems. This is because the a-priori model used therein does not need to be communicated from the central modem to any remote modem in the first stages of initialization before bitloading, as it is the case in the last mentioned prior art document.

Also another characterizing embodiment of the present invention is that said artificial noise corresponds to a model of the sum of loop noises contributed by signals transmitted on a plurality of n−1 communication lines arranged in a cable containing a plurality of n communication lines, of which the first mentioned communication line is one member of the plurality.

Further characterizing embodiments of the present telecommunication system with a modem are mentioned in the appended claims.

It is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawings wherein:

FIG. 3b shows details of the injection of artificial noise AN in the frequency domain processing module TXFDP according to FIG. 3a.

Figure 1:
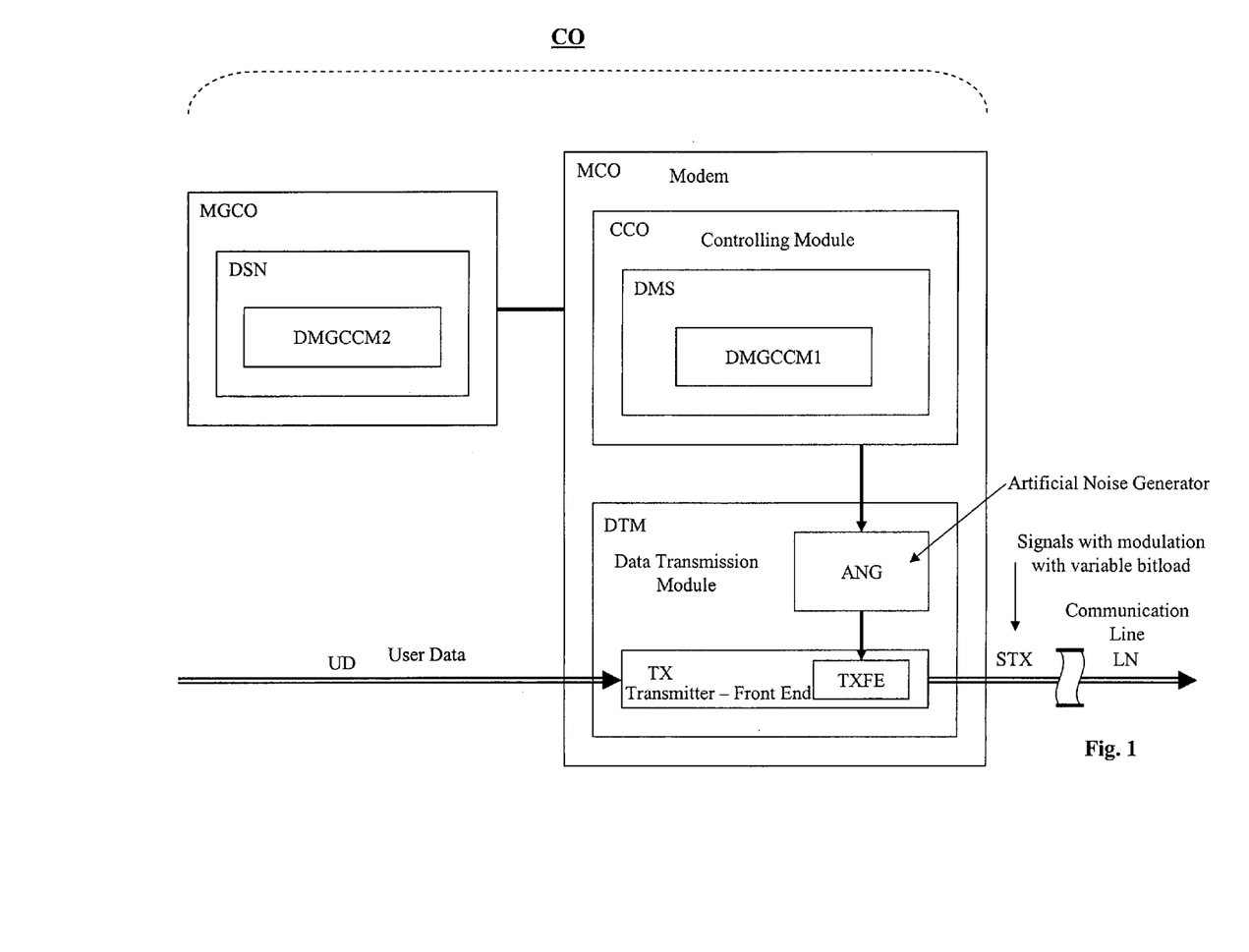
FIG. 1 mainly represents the Central Office CO part of a telecommunication system with a modem MCO according to the invention.

The telecommunication system shown at FIG. 1 is preferably a Digital Subscriber Line xDSL telecommunication system comprising a communication line LN that interconnects a Central Office CO to a Customer Premises Equipment (CPE, not shown). The Central Office CO is provided with at least one modem MCO, this modem being preferably of the type adaptive xDSL modem capable of operating at different datarates and bitloads. The modem MCO comprises a Data Transmission module DTM adapted to transmit channels transporting user data UD by means of signals STX with modulation having a bitload that is modifiable. The direction of data-transmission from the modem MCO located at the Central Office CO to a modem located at the Customer Premises is called the Downstream direction. Upstream is the direction of data-transmission from the modem located at the Customer Premises to the modem MCO located at the Central Office CO.

The "bitload" is defined as following. If the modulation is BaseBand Modulation (BBM) or Single Carrier Modulation (SCM), the bitload corresponds to the number of information bits per modulation symbol, also called modulation or signaling time slot. If the modulation is Multi Carrier Modulation (MCM), the bitload corresponds to the set of numbers describing the number of information bits per modulation symbol for each carrier, e.g. corresponds to the array of bi as defined in ITU-T G.992.3 section 8.5.

BaseBand Modulation (BBM) is a modulation type without first modulating the signal onto a carrier, e.g. Pulse Amplitude Modulation (PAM); Single Carrier Modulation (SCM) is a modulation type in which the signal is modulated onto a single carrier, e.g. Quadrature Amplitude Modulation (QAM), Carrierless AM-PM (CAP); and Multi Carrier Modulation (MCM) is a modulation type in which multiple carriers are used, e.g. Discrete MultiTone modulation (DMT). These modulation types are generally known in the art.

The process of determining a bitload is called "bitloading". This can be a determination of the complete bitload as in initialization, a determination of a part of the bitload as in "showtime" Bitswapping, e.g. as defined in ITU-T G.992.1, or determination of a part of the bitload or of the complete bitload as in "showtime" On Line Reconfiguration (OLR), e.g. as defined in ITU-T G.992.3.

"Initialization" (a.k.a. Training) is the state (or time period) immediately preceding "Showtime", during which signals are exchanged between the modems in order to prepare showtime, but in which no user data are being communicated. Showtime (a.k.a. Data Transmission State or Steady State) is the state during which user data are being communicated by the modems. The terms "Initialization" and "Showtime" are also used in ITU-T G.992.1 and G.992.3.

The Data Transmission module DTM of the modem MCO is coupled to a controlling module CCO able to modify the bitload used by the associated receiving module as a function of current measurements of channel conditions performed by the modem MCO immediately prior to a current bitloading. Additionally, the controlling module CCO is also able to modify this bitload as a function of a bitloading channel condition model DMGCCM1 that is independent of the current measurements.

A channel condition is any characteristics of the channel. The channel being defined as starting at the interface where the to be transmitted user data is given as input to the modem, and ending at the interface where the received user data is given as output by the modem connected to the other end of the communication line LN. Therefore, the channel includes, on top of the communication line, following modem functional blocks, well known in the art: line interface, analog front end, analog-to-digital convertors, digital-to-analog convertors, transmit and receive filters, gain scalers, modulation/demodulation, constellation encoding/decoding, channel coding/decoding, forward error correcting coding/decoding, scramblers, CRC generation and verification, . . . . As such any parameter which can be measured in any of the functional blocks of the channel constitutes a channel condition. The channel condition measurement predominantly used in the prior art is the Signal-to-Noise Ratio (SNR) measured at the receiver, for MCM typically on each of the carriers.

The idea of the present invention is to provide a controlled transmit signal quality degradation. The level of degradation is typically programmable via a local or remote management interface as will be mentioned below. It is preferred that this degradation is active all the time, i.e. during INITIALIZATION and operation (SHOWTIME). However, for some modem types it could be sufficient to activate the degradation only during specific time periods, e.g. certain signals of initialization.

In the telecommunication system shown at FIG. 1, the bitloading channel condition model DMGCCM1 independent of the current measurements is either a function of one or more measured bitloading channel condition models previously obtained through measurements by the modem, a function of a first managed channel condition model, which is itself a function of a second managed channel condition model UMGCCM2 transferred to the modem MCO by a management device MGCO coupled, but external, to the modem, prior to the current bitloading, or a combination of both.

In more detail, the controlling module CCO of the CO comprises modem storage means DMS adapted to store the bitloading channel condition model DMGCCM1 as a function of the first managed channel condition model that is function of a second managed channel condition model DMGCCM2. The management device MGCO has management storage means DSN adapted to store the second managed channel condition model DMGCCM2.

Hypothetically it is possible that the modem chipset automatically determines the programmable level internally, and therefore has no explicit management interface.

The receiving module of the modem MCO located at the Central Office CO part of the telecommunication system is an downstream Data Transmission module DTM coupled to the controlling module CCO of the modem MCO. The modem storage means DMS of the controlling module CCO is able to store a bitloading channel condition model DMGCCM1 that is a downstream bitloading channel condition model. Preferably, the management device MGCO is also located at the Central Office CO and has a downstream management storage means DSN for storing the second managed channel condition model that is a second upstream managed channel condition model DMGCCM2. The measured bitloading channel condition model and the first managed channel condition model of this downstream bitloading channel condition model DMGCCM1 are respectively downstream measured bitloading channel condition model and downstream first managed channel condition model DMGCCM1.

The management device MGCO is preferably located at the Central Office CO and is coupled to the modem MCPE located at the Customer Premises Equipment CPE via the communication line LN. The management device MGCO then has downstream management storage means DSN for storing the second managed channel condition model to be used by a controlling module of the CPE as a second downstream managed channel condition model.

Some of the various possible embodiments and operations of the present xDSL telecommunication system with controlled transmit signal quality degradation will be described hereafter.

A specific degradation is realized by an injection of "Artificial Noise" AN, which is generated locally in the transmitter by an artificial noise generator ANG and added to the original transmit signal to obtain a degraded transmit signal. "Artificial Noise" is defined as a random signal which is uncorrelated with the original transmit signal and has a lower level than the original transmit signal.

It is to be noted that the addition of the artificial noise to the transmission signal is generally preferred, although any other combination of these signals is also possible.

Several variants of artificial noise could be used. For example with different Probability Density Functions (PDF): e.g. Gaussian PDF, brickwall PDF, discrete PDF, . . . .

In a preferred embodiment and making again reference to FIG. 1, the method is applied to the downstream transmit signal, i.e. from a central modem MCO to a remote modem, in which the level of "Artificial Noise" is programmable and communicated to the Central modem via a local management interface (e.g. G.997.1 Q interface) by an external central entity, before the start of INITIALIZATION.

In more detail, and as shown at FIG. 1, the Artificial Noise AN is provided by the artificial noise generator ANG located in the data transmission module DTM of the mode MCO. The artificial noise generator ANG is coupled to a transmitter TX and more particularly to a front end thereof TXFE. The transmitter TX interfaces the user data UD and the communication line LN. TX includes the transmitter front end TXFE that comprising the cascade connection of a transmit frequency domain processing module TXFDP, an Inverse Fast Fourier Transformer IFFT and a transmit time domain processing module TXTDP.

Figure 2:
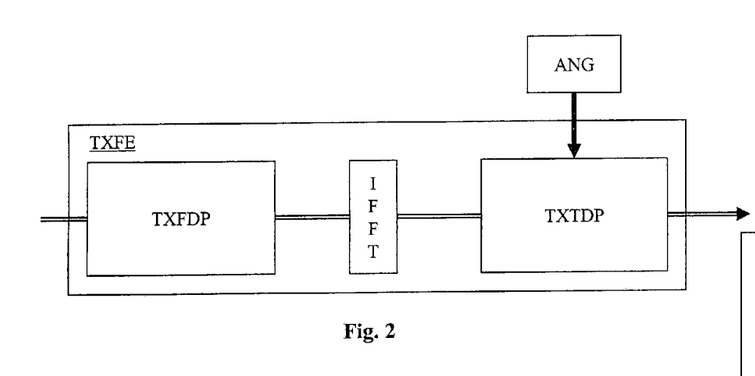
FIG. 2 shows the injection of artificial noise AN in the transmit time domain processing module TXTDP of the data transmission module DTM of the modem MCO.

In a first embodiment shown at FIG. 2, the artificial noise generator ANG is coupled to an input of the transmit time domain processing module TXTDP of the transmitter front end TXFE. The signals, i.e. the artificial noise AN, provided by the artificial noise generator ANG are then added by the transmit time domain processing module TXTDP to the user data UD transmitted to the communication line LN.

Figure 3A:
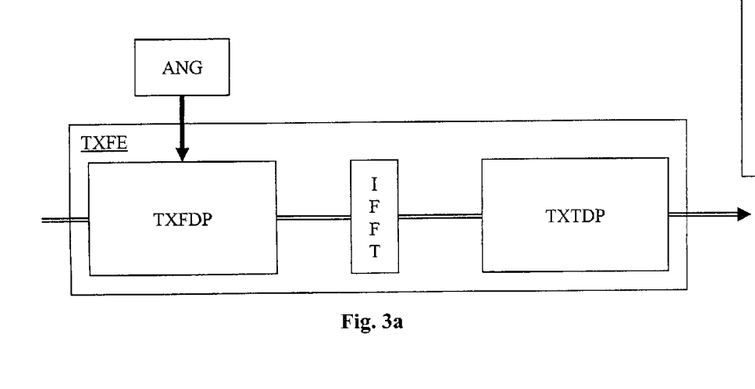
FIG. 3a shows the injection of artificial noise AN in the transmit frequency domain processing module TXFDP of the data transmission module DTM of the modem MCO.

For MCM modems this artificial noise can easily be made frequency dependent by injecting the noise AN in the frequency domain before the IDFT/DFT block IFFT. In this second embodiment, shown at FIG. 3a, the artificial noise generator ANG is coupled to an input of the transmit frequency domain processing module TXFDP of the transmitter front end TXFE. The signals of the artificial noise generator ANG are then added by the transmit frequency domain processing module TXFDP to the user data UD transmitted to the communication line LN.

Figure 3B:
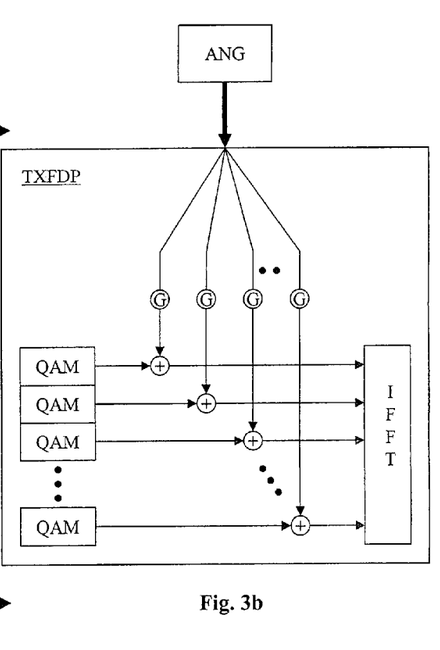

In this second embodiment, a different noise level could be injected for every MCM sub-carrier. In more detail, as shown at FIG. 3b, the multiple independent noise signals provided by the artificial noise generator ANG are each passed through a gain scaling G prior to be supplied to an adder +. These adders + also receive the specific DMT subcarrier signals QAM, and the outputs thereof are connected to inputs of the Inverse Fast Fourier Transformer IFFT.

The programmable level of "Artificial Noise" could be based on an a-priori model of the "worst case" channel conditions (noise level, SNR, . . . ).

Several variants of this a-priori model could be envisaged:
1. An a-priori model of the "worst case" SNR that can be applied to all XDSL modems.

Typically, the model is defined in terms of SNR as seen at the remote receiver input. The level of "Virtual Noise" to be added to the transmit signal is such that it realizes this same SNR at the output of the transmitter. As the channel attenuates the signal and the virtual noise with the same amount, the Signal-to-Virtual-Noise at the transmitter will be identical to the Signal-to-Virtual-Noise at the receiver. At the receiver the attenuated virtual noise is combined with the actual noise of the channel.

The a-priori "worst case" SNR model, includes information to determine the assumed "worst case" SNR level:
In general, over the complete frequency range or over parts of the frequency range
In particular for MCM modems, information could be conveyed in a per MCM carrier format.

The description of the "worst case" SNR model could take various formats. Some examples are:
Analytical formula defined in the standard, and for which the only the parameters are communicated to the modems
Algorithmic descriptions defined in the standard, and for which the only the parameters are communicated to the modems
A table of levels at equidistant frequency points, possibly corresponding with each MCM carrier frequency
A table of levels at equidistant or non-equidistant points, where the information on other frequency points is to be extracted via some predetermined inter/extrapolation method(s).

It is to be noted that the term "worst case" is used in this description as a short hand. It does not necessary mean the "worst case" ever, e.g. over infinite time or over all lines of complete network. It rather corresponds to that case of noise conditions that an operator finds acceptable, e.g. acceptable stability of the link over a certain given time period, for a subset of the network, . . . .

2. An a-priori model of the "worst case" noise level that also can be applied to all XDSL modems.

Typically, the model is defined in terms of noise levels as seen at the remote receiver input ("receiver referred noise"). The "Virtual Noise" added to the transmit signal is a "transmitter referred noise"). The transmitter referred noise can be calculated as:

$$TX\_reffered\_N(f) = RX\_reffered\_N(f)/(|H(f)|^2)$$

with
TX_reffered_N(f)=The virtual noise Power Spectral Density (PSD) at the transmit line interface;
RX_reffered_N(f)=The noise Power Spectral Density (PSD) at the receiver line interface; and
H(f)=Transfer Function of the channel.

In general, this method can guarantee absolute stability of the link (e.g. no RE-INITIALIZATION and no excessive BER) without an excessive loss of datarate working without modification of installed base remote modems. Also, it gives complete control to an external entity. Only such an external entity can have enough intelligence to determine the long term behavior of a network, possibly with other a-priori information input by the operator (e.g. statistics).

Furthermore, the closest prior art seems to be the above-mentioned fourth known method which is the method most used in current ADSL and VDSL. An advantage of the present method there-over is that it does not have an excessive loss of datarate to guarantee stability:

as described above, the fourth known method exhibits an excessive datarate loss corresponding to 18 dB loss for 2 . . . 6 Mbps operation, whilst the present method only exhibits a datarate loss corresponding to only 6 dB loss for a 6 Mbps operation.

Figure 4:
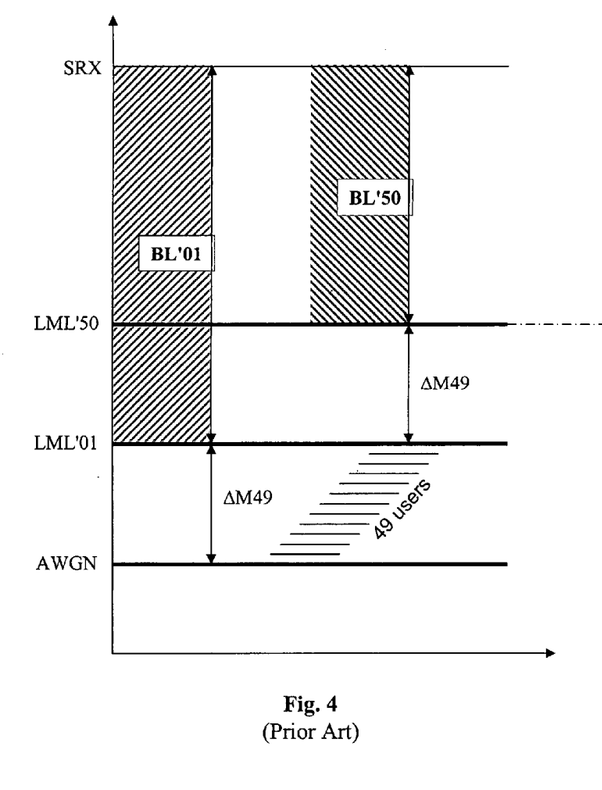
FIG. 4 illustrates a noise margin as modems are switched on according to the prior art.
Figure 5:
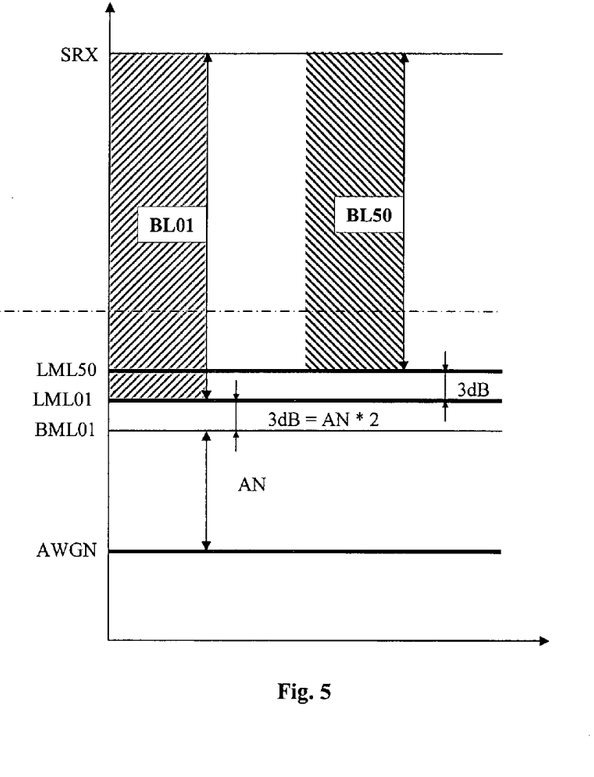
FIG. 5 illustrates a noise margin as modems are switched on according to example embodiments.

Indeed, referring to FIG. 4 (prior art) and FIG. 5 (present embodiment), suppose a twisted pair cable with, e.g. n=50 ADSL links, but where the ADSL modems are not yet all switched by their users. The ADSL crosstalk level in the cable is absent. The noise level will be equal to the background noise level AWGN. The first ADSL modem that switches on will see this background noise level during initialization.

Referring to the prior art method shown at FIG. 4, the bitloading is determined by supposing that each modem has a margin of A dB with respect to the "measured noise" at the receiver. Since it is not known that the user who connects is the first one or the 50th, for the "survival" of any user, the margins of 49 users are always taken as loop noise increase $\Delta M49$ (=49 $\Delta dB$). In this known method, the datarate or bitloading BL'01 for the first user that connects has a threshold LML'01 corresponding to the background noise AWGN (−140 dB) for no user increased by the margin $\Delta M49$. On the other hand, the datarate bitloading BL'50 for the 50th user that connects has a threshold LML'50 corresponding to the bitloading threshold LML'01 for the first connected user increased by the margin $\Delta M49$. As a consequence, the datarate BL'50 of the 50th user, i.e. the value between the Rx signal level SRX and the bitloading threshold BL'50 of this 50th user is much lower than the datarate BL'01 of the first user.

In other words, the crosstalk level will increase with each new ADSL modem that is switched on. Suppose all (50) users are switching on. With the present method, the noise is still injected at the transmitter according to the worst case noise level. This noise will add to the crosstalk of the channel which is now at its worst case level, resulting in a combined noise level power which is double of the worst case noise level, or equivalently 3 dB higher. Therefore, the operator will have to assign a 3 dB target margin in order for this first user to have a stable operation, and to withstand the noise increase. At the point where all users are switched on this first user will work at 0 dB actual margin.

Consider now the last (50th) user that connects when all other (49) users are already on line. With the present method, for this last user a noise identical to the first user is injected at the transmitter according to the worst case noise level. This noise will add to the crosstalk of the channel which is now at its worst case level, resulting in a combined noise level power which is double of the worst case noise level, or equivalently 3 dB higher.

For the last user, the noise is already at its maximum and will not increase further. Taking a large target margin is unnecessary in this case. But as the operator is not aware of the order in which users are switching on, he has to assign one target margin for all users. Therefore this 3 dB target margin is assigned as well to last user.

For the last user this 3 dB margin is taken with respect to a combined noise level which is in its turn 3 dB higher than the worst case channel noise. Therefore, this last user will experience a datarate loss of about 6 dB with respect to the worst case channel noise. (e.g. for 3000 m the last user will operate at the 6 Mbps=table entry corresponding with 6 dB distance to SELF XT). This is much less than in the known fourth prior art method.

In more details, and referring to FIG. 5, the background noise AWGN (−140 dB) for no user is increased by the artificial noise AN, to provide a "virtual" background noise BML01. The artificial noise AN at the transmitter is such that at the receiver it equals the worst case noise level, i.e. 49 ADSL users. This corresponds to a need of taking 3 dB margin of survival of the first user, i.e. a noise level of AWGN increased by AN at startup, but growing to a level of AN increased by 49 ADSL user at busy hours when all the 50 users are connected and transmit through the cable. The bitloading threshold LML01 of the first user is equal to the background noise BML01 increased by 3 dB, whilst the bitloading threshold LML50 of the 50th user is equal to the bitloading threshold LML01 of the first user increased by 3 dB. As a result, the datarate BL50 is only 3 dB lower than the datarate BL01. BL50 corresponds to the datarate that an operator can guarantee to every user.

Formulated with formulas:

The prior art method only realizes a capacity corresponding with an equivalent noise level given by following formula:

Equivalent_Noise(dBm/Hz)=Background_Noise (dBm/Hz)+$\Delta$+$\Delta$ with $\Delta$=noise increase from background noise level to worst case channel noise level as defined in the above table 1, whilst the present method realizes a capacity corresponding with an equivalent noise level given by following formula:

Equivalent_Noise(dBm/Hz)=Background_Noise (dBm/Hz)+$\Delta$+3(dB)+3(dB)

It is clear from the above that the present method is particularly advantageous for cases where the $\Delta$ margin ($\Delta$) is larger than 3 dB. This is the case for distances lower than 4000 meter as indicated in the above table 1.

It can thus be shown mathematically that taking the virtual noise level equal to the worst case noise level result in the optimal capacity for this method. Taking a higher virtual noise will decrease the margin to be taken but this is offset by the fact that this margin is taken to a higher combined noise level. As well, taking a lower virtual noise level will decrease the combined noise level but this is offset by the fact that a larger margin has to be taken.

It is to be noted that in real modem equipment, the injection of artificial noise can be applied to each frequency in order to model a frequency dependent noise. Moreover, in MCM modems, the artificial noise injection can be applied to each carrier.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is merely made by way of example and not as a limitation on the scope of the invention, as defined in the appended claims.

The invention claimed is:

1. A telecommunication system with a modem having a controlling module coupled to a central office data transmission module comprising:
    a transmitter configured to transmit at least one channel via a communication line, said channel being configured to transport user data signals with modulation having a bitload that is modifiable, said bitload being a set of numbers describing the number of information bits per modulation symbol for each carrier; and
    an artificial noise generator, being a module of said data transmission module, coupled to said transmitter and configured, to inject an artificial noise into the transmitter to influence the user data signals transmitted by said data transmission module to the communication line, wherein said artificial noise corresponds to a model of the sum of loop noises contributed by signals transmitted on a plurality of n−1 communication lines arranged in a cable containing a plurality of n communication lines, of which the first mentioned communication line is one member of the plurality of communication lines.

2. The telecommunication system according to claim 1, wherein
    said transmitter includes a transmitter front end having a cascade connection of a transmit frequency domain processing module, an Inverse Fast Fourier Transformer and a transmit time domain processing module, and
    said artificial noise generator is coupled to an input of said transmit time domain processing module.

3. The telecommunication system according to claim 2, wherein said transmit time domain processing module is configured to add signals provided by said artificial noise generator to the user data-transmitted to the communication line.

4. The telecommunication system according to claim 1, wherein
    said transmitter includes a transmitter front end having the cascade connection of a transmit frequency domain processing module, an Inverse Fast Fourier Transformer and a transmit time domain processing module, and
    said artificial noise generator is coupled to an input of said transmit frequency domain processing module.

5. The telecommunication system according to claim 4, wherein said transmit frequency domain processing module is configured to add signals provided by said artificial noise generator to the user data transmitted to the communication line.

6. The telecommunication system according to claim 5, wherein
    the signals provided by said artificial noise generator are a plurality of independent noise signals, and
    said transmit frequency domain processing module configured to multiply each of said independent noise signals by a predetermined gain scaling and to add each of the results to a specific DMT subcarrier signal.

7. The telecommunication system according to claim 1, wherein the controlling module of said modem is coupled to a management device configured to store parameters of a "worst case" channel condition and to control therewith said controlling module to control the generation of said artificial noise by said artificial noise generator.

8. The telecommunication system according to claim 7, wherein
    each of the plurality of communication lines of said cable operates similarly to said first mentioned communication line, and
    said artificial noise generator is configured to provide signals based on a model of the signal-to-noise ratio on said channel of said first communication line.

9. The telecommunication system according to claim 7, wherein
    each of the plurality of communication lines of said cable operates similarly to said first mentioned communication line and, and
    said artificial noise generator is configured to provide signals based on a model of the noise level on said channel of said first communication line.

10. The telecommunication system according to claim 1, wherein
    said communication line is a digital subscriber line, and
    said modem is an adaptive Digital Subscriber Line modem.

11. The telecommunication system according to claim 1, wherein said artificial noise generator is further configured to program the noise margin at 3 dB in the bitloading algorithm in the corresponding receiver, said bitloading being the process of determining the bitload.

12. The telecommunications system according to claim 1, wherein said artificial noise generator is configured to inject said artificial noise into the transmitter under control of said controlling module.

13. A method to improve the bitload of a channel transmitted via a communication line, said channel being configured to transport user data by means of signals with modulation having a bitload that is modifiable said bitload being a set of numbers describing the number of information bits per modulation symbol for each carrier, said method comprising:
    injecting an artificial noise to modify the user data signals prior to transmitting said user data on the communication line, wherein said artificial noise corresponds to a model of the sum of loop noises contributed by signals transmitted on a plurality of n−1 communication lines arranged in a cable containing a plurality of n communication lines, of which the first mentioned communication line is one member of the plurality.

14. The method according to claim 13, wherein the injecting step models said artificial noise based on-the "worst case" channel condition on said first communication line.

15. The method according to claim 14, wherein said model of "worst case" channel condition is a model of the "worst case" noise level of said channel.

16. The method according to claim 14, wherein said model of "worst case" channel condition is a model of the "worst case" signal-to-noise ratio of said channel.

17. The method according to claim 13, wherein said injecting step injects said artificial noise into the user data when said user data passes through a transmit time domain processing module coupled to the communication line.

18. The method according to claim 13, wherein said injection step injects said artificial noise into the user data when said user data passes through a transmit frequency domain processing module.

19. The method according to claim 13, further comprising:
    Programming the noise margin at 3 dB in the bitloading algorithm in the corresponding receiver, said bitloading being a process of determining the bitload.

* * * * *